Oct. 17, 1967     A. B. BAUER     3,347,321
VIBRATORY TOOL
Filed July 20, 1965
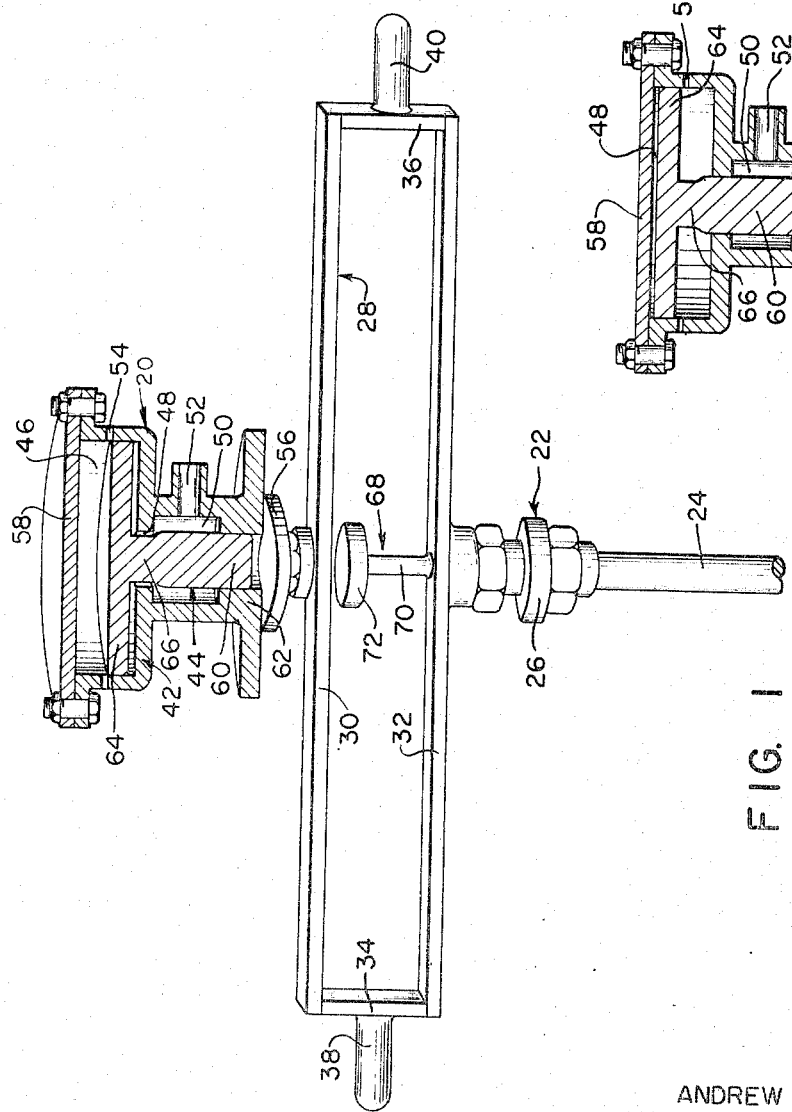
INVENTOR
ANDREW B. BAUER
BY
*Robert J. Schuller*
ATTORNEYS

United States Patent Office 3,347,321
Patented Oct. 17, 1967

3,347,321
VIBRATORY TOOL
Andrew B. Bauer, Orange, Calif., assignor to Arthur D. Little, Inc., Cambridge, Mass., a corporation of Massachusetts
Filed July 20, 1965, Ser. No. 473,419
10 Claims. (Cl. 173—118)

ABSTRACT OF THE DISCLOSURE

A vibratory tool having a motor including a reciprocating element movable along an axis of symmetry of the motor, and a tool bit, the motor and bit being fixedly mounted on a spring at positions aligned with the axis so that the latter constitutes a resonant coupling of the motor and bit to drive the bit in reciprocation solely by forces transmitted through the spring.

---

This invention relates to vibratory tools, and more particularly to percussion type tools particularly adapted for driving a tool bit directly into a work piece or material.

A number of vibratory tools of various types are known and used for driving a tool bit in percussion or impact. An exemplary device of this type is the well-known pneumatic drill which employs an air-driven hammer to strike a tool bit and displace the latter against the bias of a spring. Another well-known type of percussion tool uses a reciprocating mass suspended between a pair of resilient members so as to be capable of resonating. In such devices, the tool bit is usually either directly connected or affixed to the reciprocating mass or is intermittently struck by the latter.

In tools of these types, in which a hammer or reciprocating mass provides intermittent contact with the tool bit, the impact of the two parts frequently causes wear leading to inaccuracy or actual physical failure of the parts If the tool bit is affixed to the reciprocating mass and the tool bit jams, the motor driving the reciprocating mass can easily be damaged.

A principal object of the invention is to overcome such difficulties by providing a vibratory tool wherein the coupling between the motor and tool bit, or means for supporting the latter, is resilient.

Other objects of the present invention are to provide a vibratory tool including an oscillatory motor, a driven member, and resilient means providing the sole coupling between the motor and member such that the tool has a resonant frequency determined substantially by the masses of said motor and member and by the mass and spring constants of the resilient means; to provide such a vibratory tool in which the motor is pneumatically impelled; and to provide such a vibratory tool in which a pneumatic motor includes a free-floating piston Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and object of the present invention, reference should be had to the following detailed description taken in connection with the accompanying drawing wherein:

FIG. 1 is a schematic elevational diagram, partly in cross-section, of one embodiment of the present invention, and FIG. 2 is a diagram of the motor forming a portion of the embodiment of FIG. 1, showing the piston in an extended position.

Referring now to the drawing, there is shown in FIG. 1 an embodiment of the vibratory tool of the present invention comprising motor 20, a driven member indicated generally at 22 and including tool bit 24 and means, such as tool holder 26, to or in which the tool bit can be releasably but firmly affixed. Motor 20 and driven member 22 are resiliently coupled to one another through means such as elongated frame 28 to which both the motor and the driven member are affixed so as to be axially symmetric.

Frame 28, in the form shown, is a substantially open rectangular structure, formed for example of four straight bars 30, 32, 34, and 36 of resilient metal such as mild steel. Each bar is of substantially uniform cross section, for instance rectangular, and the bars are joined at appropriate ends as by welding to form the rectangle of the frame. Alternatively, frame 28 may take other shapes such as an elliptic spring formed from only two arcuate bars or segments. Bars 30 and 32 are preferably of equal length and are much longer (e.g. by a factor of 6 or more) than bars 34 and 36 which are also preferably of equal length. Attached respectively to bars 34 and 36, and extending outwardly of and substantially in the plane of frame 28 are handles 38 and 40.

Tool holder 26 of member 22 is fixedly mounted, as by being welded on bar 32 preferably centrally thereof, and is so disposed that when elongated tool bit 24 is mounted on the tool holder, the long axis of the bit extends substantially perpendicularly to the axis of bar 32, outwardly from the frame and in the plane of the rectangular form of the frame. Tool holder 26 and bit 24 can be complementarily threaded for joining or the holder may be any of the well-known type of chucks. Bit 24 typically is any of a number of known percussion drill bits.

Motor 20 comprises basically cylinder 42 and piston 44. Cylinder 42 is formed of three cylindrical, coaxially sequentially adjoined chambers, main chamber 46, sub-cylinder 48 and plenum chamber 50. Main chamber 46 has the greatest cylindrical radius of the three chambers, plenum chamber 50 being of somewhat lesser radius. Sub-cylinder 48, which lies between the other two chambers has the smallest radius and thus defines a constriction between the other two chambers. Disposed in the cylindrical wall of plenum chamber 50 is air inlet port 52. Main chamber 46 is provided in its cylindrical wall with at least one air outlet or port 54 intermediate the cylindrical ends of the chamber. The respective ends of chambers 50 and 46 not adjoined to sub-cylinder 48 are sealed or capped with cylinder heads 56 and 58. In the embodiment shown, cylinder head 56 is fixedly mounted on bar 30 preferably centrally thereof such that the common cylindrical axis of the chambers extends outwardly from the frame, substantially perpendicularly to the long axis of bar 30 in the plane of the rectangular form of the frame. It will be apparent that the cylindrical axis of the chambers of motor 20 and the longitudinal axis of tool bit 24 are substantially collinear and are on opposite sides of frame 28.

Piston 44 is a unitary member having three sections, sub-piston 60 dimensioned and shaped to fit snugly but slidingly within one end in cylindrical guide means 62 adjoining plenum chamber 50, piston head 64 disposed in main chamber 46, and piston neck 66 which integrally connects sub-piston 60 with piston head 62. Sub-piston 60 is of lesser cross-sectional area than the plenum chamber, therefore providing a space into which air can readily enter from inlet 52, but is also dimensioned and shaped cylindrically so that its opposite ends are slidable snugly into and out of sub-cylinder 48 and guide means 62 respectively. Piston head 64 preferably is disc shaped, having a cylindrical diameter which fits snugly within main chamber 42, and having a thickness of less than the smaller distance between exhaust port 54 and either end of chamber 42. Piston neck 66 is of much lesser diameter than sub-cylinder 48. The length of piston 44 and its sections along the cylindrical axis of cylinder 42 is such that the piston can oscillate or reciprocate between a first or charge position such as is shown in FIG. 1, wherein piston head 64 is adjacent the end of chamber 46 adjoining sub-cylinder 48 and a second or exhaust position, such as is shown in FIG. 2, wherein head 64 is adjacent the opposite end of chamber 46. In the charge position, one face of head 64 is to one side of port 54 whilst in the exhaust position the other face of head 64 is on the opposite side of port 54. Similarly, when the piston is in the charge position, sub-piston 60 lies wholly within plenum chamber 50 and guide means 62 and does not occlude free passage of air between plenum chamber 50 through sub-cylinder 48 to a face of piston head 64; when piston 44 is in exhaust position, sub-piston 60 extends into the sub-cylinder, blocking the passage of air from the plenum chamber into the main chamber.

In operation, high-pressure air is applied at inlet port 52, preferably carrying a small amount of oil for lubrication. The air and oil can typically be provided by a standard air compressor unit with, if desired, an oil tank to add the oil. Air entering plenum chamber 50, when the piston is in the position shown in FIG. 1, exerts pressure against the lower face of piston head 64, forcing the latter upward. The piston moves upwardly until it reaches, as shown in FIG. 2, the position at which the close fit between sub-cylinder 48 and sub-piston 60 blocks passage of air from inlet port 52 to the main chamber, and the piston head has moved to a position at which it no longer blocks pneumatic communication between main chamber 46 and outlet port 54. Thus, when the piston is positioned as shown in FIG. 2, air previously trapped in the main chamber is vented through outlet port 54.

The upward motion of the piston however, as the piston head uncovers outlet port 54, causes air to be trapped in that portion of main chamber 46 between cylinder head 58 and outlet port 54, tending to compress the trapped air. Not only does this compression result in stopping upward piston motion before the piston can contact cylinder head 58, but the compressed air exerts pressure against the other face of the piston head urging the latter downwardly. Back-pressure against the piston head at this point is merely atmospheric because the other portion of the main chamber is open to the atmosphere through port 54, and the high-pressure air at port 52 is blocked from acting on the piston.

The piston thus moves downwardly until the piston face passes port 54 and the pressure in the upper portion of the main chamber drops to the atmospheric level. The downward piston motion also serves to move sub-piston 66 out of the sub-cylinder so that the high pressure air in the plenum chamber can pass through the space between piston neck 66 and the sub-cylinder walls and again exert upward pressure against the piston head. As sub-piston 60 penetrates into guide-means 62 during the downward motion of the piston, air trapped between the guide means and sub-piston is compressed, serving as a pneumatic buffer which prevents contact between the sub-piston and cylinder head 56.

The rate at which the piston oscillates or reciprocates is determined of course by the dimensions and positioning of the parts, the mass of the piston, the pressure at inlet port 52 and the like. It will be apparent that the energy expended by expansion of the high pressure air applied at the inlet port is transmitted to the piston and in turn the kinetic energy of the latter is transmitted to the cylinder through the compression of air trapped alternately at the ends of the cylinder. Because the cylinder is mounted directly on frame 28, the energy of reciprocating motion of the cylinder in turn is imparted to the frame which being elastic serves to store this energy. Because the piston is not mechanically attached or coupled to the frame, the embodiment shown eliminates problems of piston binding against cylinder walls because of frame misalignment or imperfections.

The pulsating forces of the motor acting on the frame provide a drive which sets the frame into oscillation. The frame is structured such that it has substantially only a single degree of freedom, i.e. can oscillate primarily in its plane in a direction along or parallel to the axis of symmetry of the motor cylinder and bit. Because the frame, in effect, constitutes a spring between two masses (the mass of the motor minus the piston mass and the tool-bit and tool holder mass), the frame oscillation will have its largest amplitude when the motor operates close to the natural or resonant frequency of the masses and spring combination. Thus, the operating frequency of the motor should be closely matched to the natural frequency of the system by selecting an appropriate size for the motor parts and proper input air pressure.

The frame should be constructed so as to oscillate preferably symmetrically in the plane of the rectangular form and linearly along the axis through the cylinder and tool bit; (i.e., the masses are mounted at points of maximum amplitude of frame oscillation) and should be dimensioned such that the node occurs along a line joining handles 38 and 40. In order to limit the frame vibration amplitude, for example when no load is on the bit, to a safe level, the embodiment shown includes damping means 68 in the form of stud 70 mounted, for example, on bar 32 in the plane of the rectangular form of the frame, and extending toward bar 30. Mounted on stud 70 is impact plate 72 positioned a predetermined distance away from bar 30 when the frame members on bars 30 and 32 are stationary.

It will be apparent that the oscillatory energy imparted to frame 28 will be imparted to driven member 22 causing the latter to recirpocate along the longitudinal axis of the bit, thereby providing the desired percussive force for drilling.

In practice, an embodiment as described has been operated using nitrogen gas at about 70 p.s.i.g. as the high pressure "air," and found to provide a vibrational frequency of about 188 c.p.s. Raising input pressure at port 52 to 150 p.s.i.g. raises the operating frequency to 200 c.p.s.

Since certain changes may be made in the above apparatus without departing from the scope of the invention herein involved it is intended that all matter contained in the above description or shown in the accompanying drawings shall be interpreted in an illustrative and not in a limiting sense.

What is claimed is:
1. A vibratory tool comprising, in combination:
   an oscillatory motor;
   a driven tool bit; and
   resilient means affixed to both said motor and said bit so as to provide the sole coupling for holding said motor and bit for axially symmetric oscillation at a common natural frequency determined substantially by the masses of said motor and bit and by the mass and spring constant of said resilient means.

2. A vibratory tool as defined in claim 1 wherein said motor is a free-piston, gas driven motor.

3. A vibratory tool as defined in claim 2 wherein said motor is formed so as to be capable of oscillating substantially in reasonance with said natural frequency.

4. A vibratory tool comprising, in combination:
   motor means having a reciprocating piston movable substantially linearly along an axis of symmetry through said motor means;

tool bit means; and spring means affixed to and between said motor means and said bit such that said motor means and bit are aligned substantially with said linear motion, said spring means providing the sole mechanical coupling between said motor means and said bit.

5. A vibratory tool as defined in claim 4 wherein said spring means is substantially free to oscillate substantially only in the line of said motion.

6. A vibratory tool comprising, in combination:

an elongated supporting frame comprising a pair of members elastically distortable with respect to one another along substantially only one degree of freedom normal to the axis of elongation of the frame and in a plane common to said members;

motor means mounted on one of said members substantially at the point of maximum amplitude of oscillation of said member, said motor means comprising a cylinder fixed to said point with its cylindrical axis lying substantially in said plane and normal to said axis of elongation, and a free-floating piston disposed in said cylinder for reciprocating motion within the latter;

an elongated tool bit;

means for fixedly mounting said tool bit upon the other of said members substantially at the point of maximum amplitude of oscillation of said member with the axis of elongation of said bit directed substantially collinearly with said cylindrical axis;

said frame constituting the sole mechanical coupling between said cylinder and said bit.

7. A vibratory tool comprising, in combination, an elongated supporting frame comprising a pair of members elastically distortable with respect to one another substantially only one degree of freedom normal to the axis of elongation of the frame and in a plane common to said members;

motor means mounted on one of said members substantially at the point of maximum amplitude of oscillation of said members, said motor means comprising a cylinder fixed to said point with its cylindrical axis lying substantially in said plane and normal to said axis of elongation, and an oscillatable member disposed within said cylinder and movable substantially only along said axis for providing a reciprocating periodic linear force substantially along to said axis;

an elongated tool bit;

means for fixedly mounting said tool bit upon the other of said members substantially at the point of maximum amplitude of oscillation of said member with the axis of elongation of said bit directed substantially collinearly with said cylindrical axis;

said frame providing the sole coupling for holding said motor means, tool bit and means for mounting said tool bit so that said tool is axially symmetrically oscillatable at a natural frequency determined substantially by the masses of said motor means, tool bit and means for mounting said tool bit, and the spring constants of said frame.

8. A vibratory tool as defined in claim 7 wherein said motor means is formed so as to be capable of oscillating substantially in resonance with said natural frequency.

9. A vibratory tool as defined in claim 8 including means for limiting the maximum amplitude of resonant oscillation of said frame.

10. A vibratory tool as defined in claim 9 including handle means disposed substantially at the vibrational node of said tool.

References Cited

UNITED STATES PATENTS

| 1,414,224 | 4/1922 | Smith | 173—134 |
| 1,626,087 | 4/1927 | Hultquist | 173—134 |
| 2,420,793 | 5/1947 | O'Connor | 173—49 |
| 3,108,644 | 10/1963 | Gustafson | 173—118 |
| 3,253,663 | 5/1966 | Burgess | 173—131 |
| 3,275,089 | 9/1966 | Kaiser et al. | 173—162 |

FOREIGN PATENTS

| 592,612 | 8/1925 | France. |

FRED C. MATTERN, JR., *Primary Examiner.*

L. P. KESSLER, *Assistant Examiner.*